No. 686,163. Patented Nov. 5, 1901.
J. STRAUB.
LOADING DEVICE.
(Application filed Aug. 12, 1901.)
(No Model.) 2 Sheets—Sheet 1.
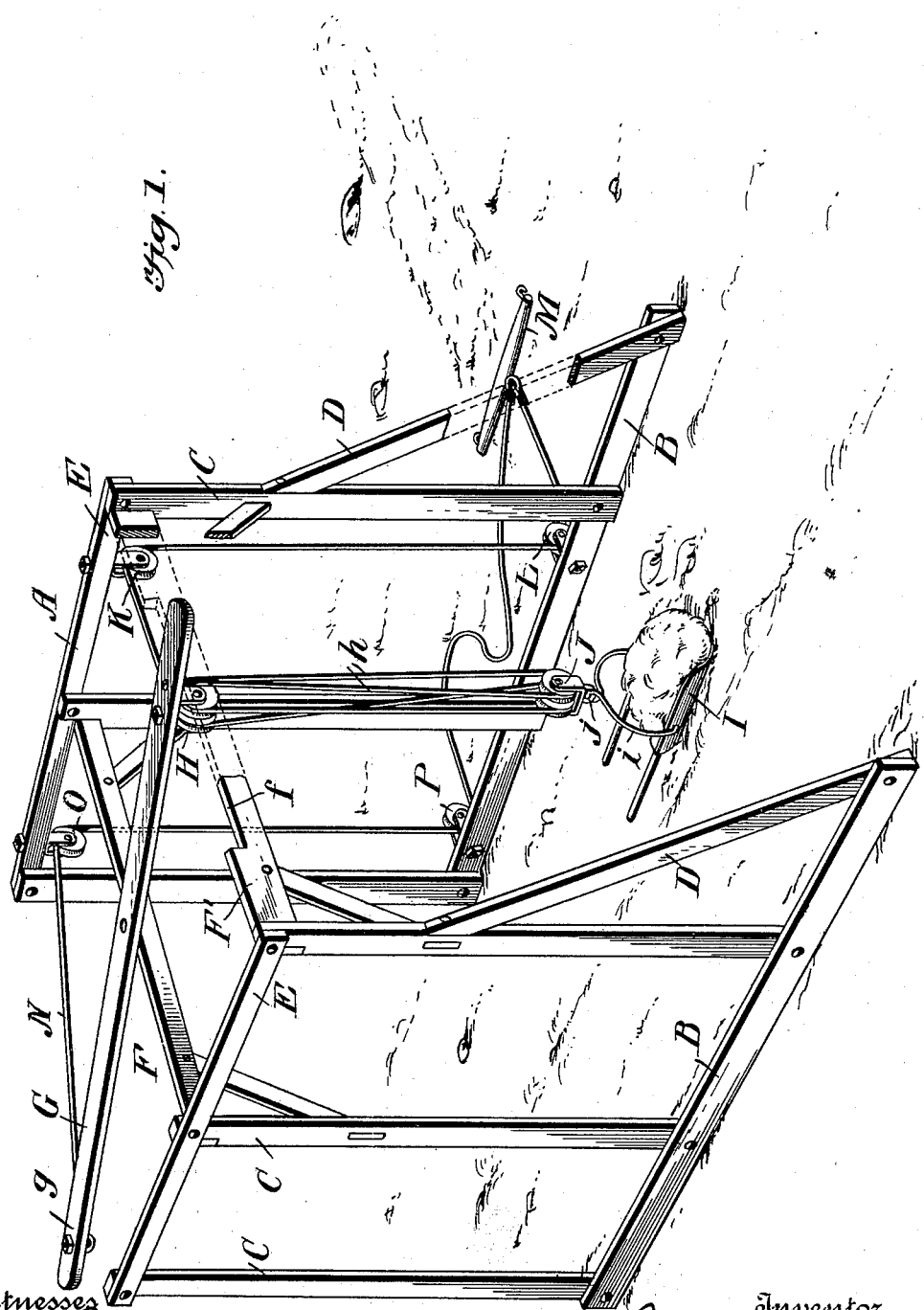

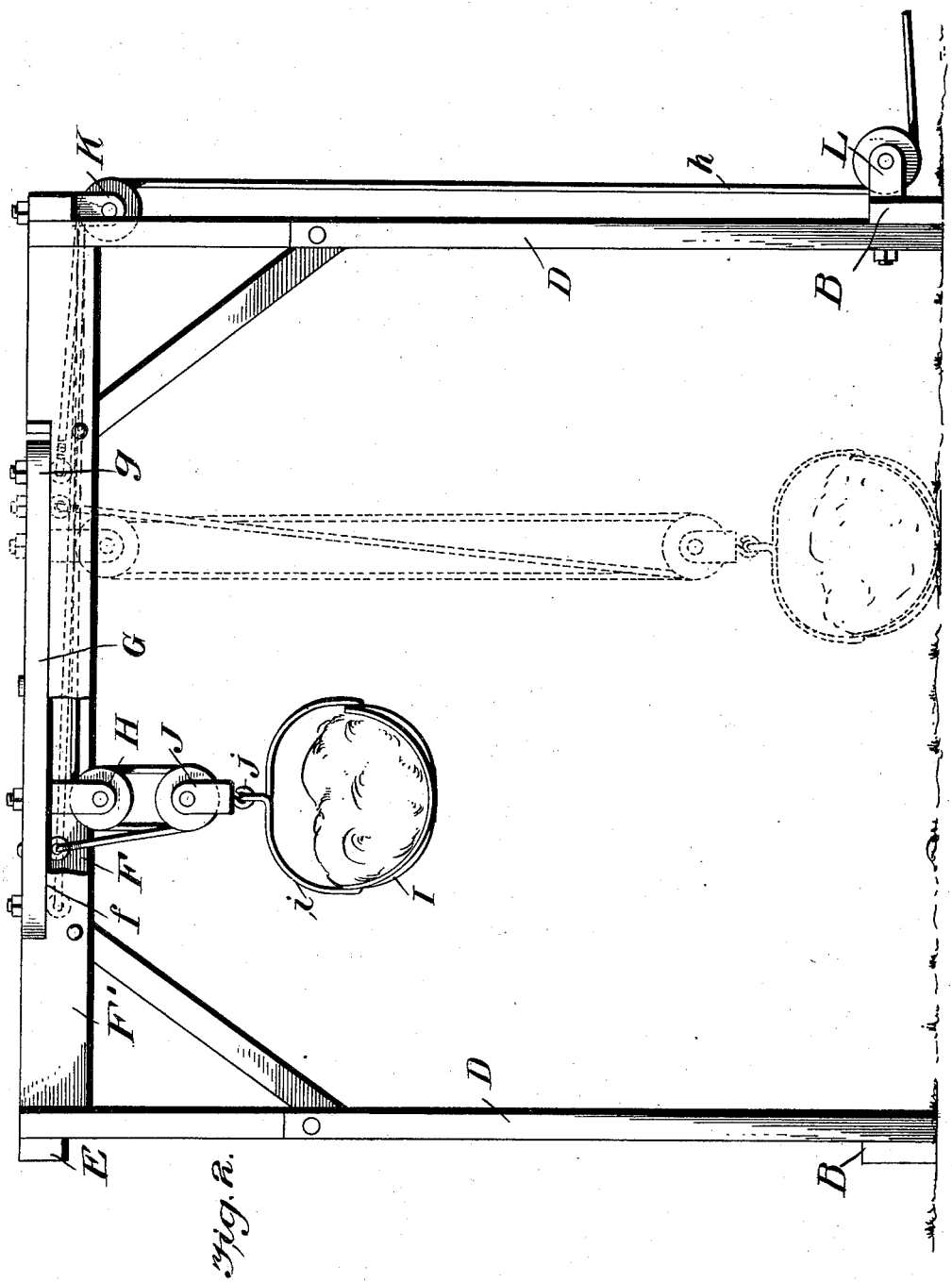

UNITED STATES PATENT OFFICE.

JACOB STRAUB, OF ELMORE, WISCONSIN.

LOADING DEVICE.

SPECIFICATION forming part of Letters Patent No. 686,163, dated November 5, 1901.

Application filed August 12, 1901. Serial No. 71,802. (No model.)

*To all whom it may concern:*

Be it known that I, JACOB STRAUB, a citizen of the United States, residing at Elmore, in the county of Fond du Lac and State of Wisconsin, have invented certain new and useful Improvements in Loading Devices; and I do hereby declare the following to be a full, clear, and exact description of the invention, such as will enable others skilled in the art to which it appertains to make and use the same.

My invention relates to improvements in loading devices for wagons, cars, and the like, and has for its object certain features of novelty that will hereinafter appear.

In order to explain my invention, reference will be had to the accompanying drawings, wherein—

Figure 1 is a perspective view of the device, and Fig. 2 is an end view of the same.

The same letters are employed to designate similar parts throughout both views.

A represents a framework made up of the horizontal base portions B B, to which are bolted or otherwise secured the uprights C C. Secured to one or more of these uprights C C may be provided braces D D, adapted to stiffen the frame.

E E are horizontal stringers connecting the upper ends of the uprights C C, these stringers being connected by the beams F F'. Upon the beam F is pivotally secured the swinging lever or arm G, one end of this arm G resting in the recess $f$ of the beam F'. To this end of the arm G is secured the double pulley H, carrying the rope $h$, passing over the lower pulley J, carrying the hook $j$, adapted to support the scoop I. This rope $h$ is passed four times around the pulleys H J and then over the guides or pulleys K, supported by the stringer E, down over the pulley L, secured by the beam B, and is then attached to the whiffletree M. To the opposite end of the swinging arm G is secured the end of the rope N, which passes over the guide-pulleys O P and is then attached to the whiffletree M, a certain amount of slack being left in the said cord N.

The manner in which the device is generally employed is as follows: The device is generally brought into service in loading gravel or the like upon wagons, cars, or the like, the scoop I being drawn along the ground by horse or other suitable power until the same is loaded and drawn under the frame. The hook $j$ of the pulley J is then hooked in the hole $i$ of the scoop and the horse attached to the whiffletree M. The wagon or car is brought beneath the frame and occupies a position directly beneath the scoop I, (full lines, Fig. 2.) The horse or horses are then driven ahead, the rope $h$ drawing the pulley J and scoop I upward until the cord N has become tight. The continued movement of the horse causes the rope N to swing the arm G around, the scoop occupying the position shown in full lines in Fig. 2, the scoop having been automatically raised from the position indicated in dotted lines in Fig. 2 and swung into the position shown in full lines. The horse carrying the whiffletree M is now brought back after the scoop has been dumped and the scoop is lowered for the next load.

While I have described one method of using my apparatus, it will be obvious to any one skilled in the art that the said apparatus may be applied to various uses, the framework being changed to suit varying requirements, it being understood that I do not limit myself to the precise details shown.

Having thus described my said invention, what I claim, and desire to secure by Letters Patent of the United States, is—

In a device of the character described, the combination with a framework; of a swinging arm pivoted in said frame, hoisting-pulleys carried by one end of said arm, a rope passing over said pulleys, a recessed crossbeam adapted to support the end of said swinging arm, a rope attached to the opposite end of said arm, guide-pulleys over which said ropes pass, and a whiffletree to which both of said ropes are attached, substantially as described.

In testimony whereof I affix my signature in presence of two witnesses.

JACOB STRAUB.

Witnesses:
F. F. DUFFY,
ANNE DUNN.